United States Patent [19]

Miyazaki

[11] 4,082,026
[45] Apr. 4, 1978

[54] PORTABLE PRESS

[75] Inventor: Tatsuyoshi Miyazaki, Kurobe, Japan

[73] Assignee: Yoshida Kogyo K.K., Tokyo, Japan

[21] Appl. No.: 684,886

[22] Filed: May 10, 1976

[30] Foreign Application Priority Data

May 12, 1975 Japan .............................. 50-63522[U]

[51] Int. Cl.$^2$ ............................................. B26D 7/02
[52] U.S. Cl. ........................................ 83/453; 83/463;
83/465; 83/639; 83/697
[58] Field of Search ................. 83/453, 456, 464, 465,
83/639, 697, 460, 463

[56] References Cited

U.S. PATENT DOCUMENTS

| 1,040,497 | 10/1912 | Bosler | 83/465 |
| 2,685,928 | 8/1954 | Bergh | 83/465 |
| 3,771,401 | 11/1973 | Jasinski | 83/453 |
| 3,886,825 | 6/1975 | Tanaka | 83/460 X |

Primary Examiner—Frank T. Yost
Attorney, Agent, or Firm—Hill, Gross, Simpson, Van Santen, Steadman, Chiara & Simpson

[57] ABSTRACT

A hydraulic cylinder mounted on a frame assembly is communicated with a hand operated pump for actuation thereby. A plurality of punch-die assemblies, to be selectively mounted in the frame assembly for perforating, notching clipping or like operations, each comprise a punch or punches carried by a punch holder constrained to up-and-down motion relative to a die. When placed in the frame assembly, any selected punch-die assembly has its punch holder disposed under a ram connected to the piston of the hydraulic cylinder, so that upon manual activation of the pump, the punch or punches can be forced down to perform a desired operation in cooperation with the die. The punch and die assembly has a presser which urges the workpiece against a lateral side of the punch, and the workpiece can be acted upon at two locations at the same time, one location being directly above the other.

8 Claims, 8 Drawing Figures

PORTABLE PRESS

BACKGROUND OF THE INVENTION

1. Field of the Invention

This invention relates to punch presses, and more specifically to a portable press for particular use in trimming, perforating or otherwise modifying the shape or size of extruded frame members of sash windows or the like at sites of building construction.

2. Description of the Prior Art

For installation of the outer frames of sash windows or the like in buildings, the present practice is to use frame members which have been produced by extrusion to standard sizes. Particularly in the case of private houses which have been rebuilt or enlarged, however, sometimes outer whidow frames cannot be assembled and installed properly with the use of such standardized frame members. These frame members must then be resized or reshaped.

Relatively simple resizing or reshaping jobs can be done on the site of the building, by means of simple tools which require no great operating force. For more complex jobs, however, or for those which require machinery capable of exerting greater forces, the frame members have had to be carried over to the local agent or some other establishment equipped to perform such work.

SUMMARY OF THE INVENTION

It is a primary object of this invention to provide portable press apparatus capable of performing various operations such as trimming and perforating.

Another object of the invention is to provide portable press apparatus particularly well adapted for reshaping or resizing extruded frame members of sash windows or the like at sites of building construction.

A further object of the invention is to provide portable, self-contained press apparatus which requires no connection to an external power source or the like for operation.

With these and other objects in view, an apparatus of this invention includes a punch and die assembly that has a presser that at all times can urge the workpiece into slidable engagement with the side of the punch, by which joint engagement the workpiece is held for being worked on.

In a preferred embodiment of the invention, tooling is provided where one workpiece can be acted on at two locations substantially at the same time, one location being directly above the other.

Advantageously, any desired number of punch-die assemblies, each desired for a particular operation, can be prepared for use according to the invention. Such punch-die assemblies may be employed selectively to enable the apparatus to perform complex jobs which may be required at sites of building construction.

Many other advantages and features of the present invention will become manifest to those versed in the art upon making reference to the detailed description and the accompanying sheets of drawings in which a preferred structural embodiment incorporating the principles of the present invention and related tooling are shown by way of illustrative example.

DESCRIPTION OF THE PREFERRED EMBODIMENTS

Figure 1A:
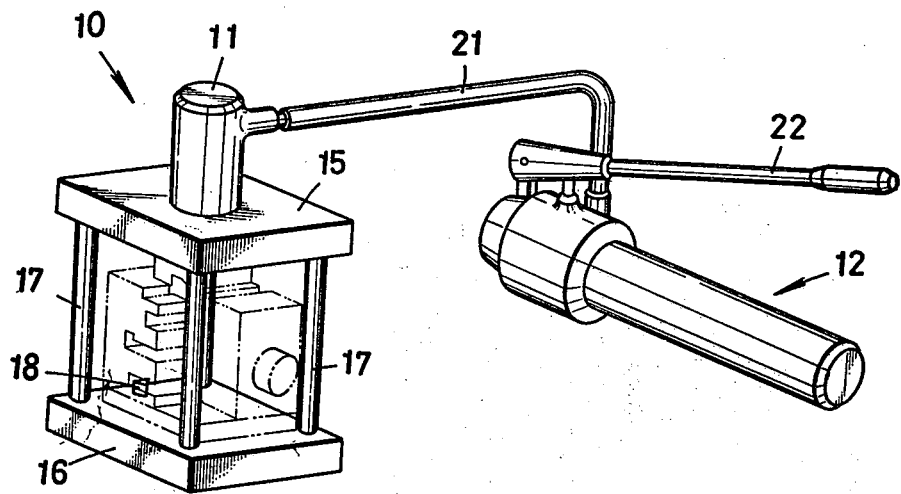
FIG. 1A is a perspective view of a frame assembly of a portable press apparatus.

FIGS. 1A 1B, 4 and 5 of the drawings show a preferred form of the portable press apparatus according to the invention, which drawings include a frame assembly 10 having a hydraulic cylinder 11 mounted uprightly thereon, a lever operated pump 12 for actuating the hydraulic cylinder, and a plurality of interchangeable punch-die assemblies 13 and 14 to be selectively mounted in the frame assembly 10, each for performing a particular machining operation.

The frame assembly 10 comprises a rectangular top plate 15 and a bottom plate 16 which are rigidly interconnected by a plurality of columns 17 extending between the corresponding corners of the top and bottom plates, so that a space is provided therebetween for installation therein of either of the punch-die assemblies 13 and 14. At least one positioning boss 18 is formed on the bottom plate 16 to permit any selected punch-die assembly to be mounted and retained in position in the frame assembly 10.

Figure 2:
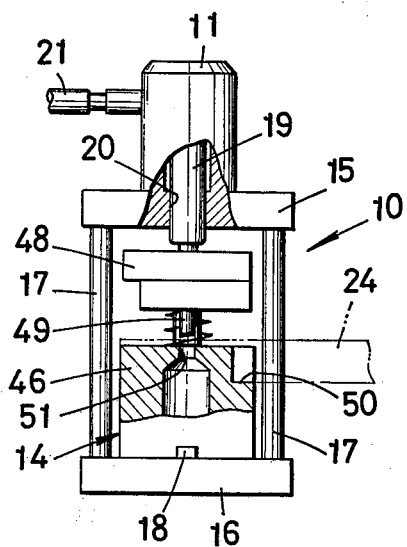
FIG. 2 is a fragmentary side elevational view, partly in section, of the press apparatus having the punch-die assembly of FIG. 1C installed in position in the frame.

As shown in FIG. 2, the hydraulic cylinder 11 fixedly mounted on the top plate 15 of the frame assembly 10 has a ram or plunger 19 connected to its piston, not shown, and this ram slidably extends downwardly through a central bore 20 of the cylinder 11.

As shown in FIG. 1A, the head end fluid chamber of the hydraulic cylinder 11 communicates with the pump 12 of known construction by means of a delivery conduit 21. The pump 12 is provided with a lever 22 which can be actuated manually in the usual manner to deliver pressurized hydraulic fluid into the hydraulic cylinder 11 and thereby to cause descent of its ram 19 into the frame assembly 10.

Figure 1B:
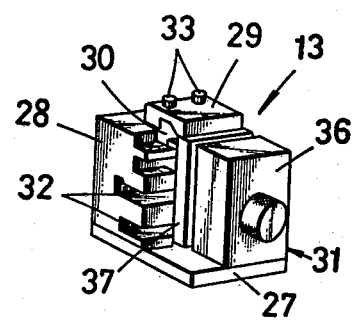
FIG. 1B is a perspective view of one form of a punch-die assembly for installation in the frame assembly shown in FIG. 1A and embodying the principles of the present invention.
Figure 1C:
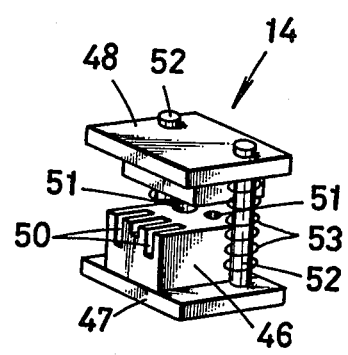
FIG. 1C is a perspective view of another form of punch-die assembly.
Figure 3A:
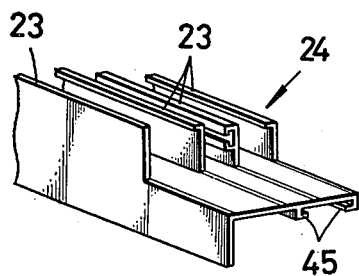
FIG. 3A is a fragmentary perspective view of an extruded window frame member which has been trimmed by the press apparatus.
Figure 3B:
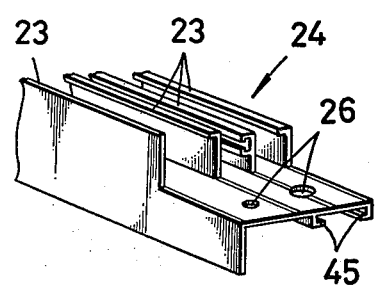
FIG. 3B is a fragmentary perspective view of the extruded window frame member of FIG. 3A which has been further perforated by the apparatus.

The two punch-die assemblies shown in FIGS. 1B and 1C are merely illustrative of a wide variety of such assemblies which can be employed in the press apparatus. The preferred punch-die assembly 13 of FIG. 1B is for use in trimming unnecessary portions of upstanding walls 23 of a workpiece 24, shown in FIG. 3A as an extruded window frame member, whereas the other punch-die assembly 14 is for use in piercing or punching holes 26 in the plane portion of the workpiece 24 which has been formed by removal of the unnecessary upstanding wall portions.

Figure 4:
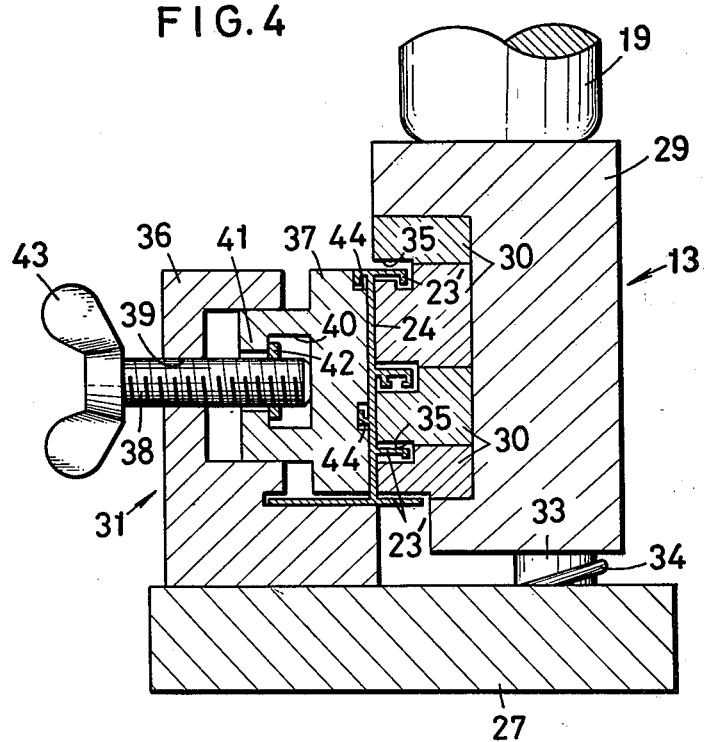
FIG. 4 is an enlarged vertical cross-sectional view of the punch-die assembly of FIG. 1B as installed in the frame assembly, the view showing the extruded window frame member of FIG. 3A held in position on the punch-die assembly for trimming operation.

As shown in FIGS. 1A, 1B and 4, the punch-die assembly 13 has a rectangular mounting plate or base 27 on which are arranged a die 28, a floating punch holder 29 carrying a set of trimming punches 30, and a work holder mechanism 31. The die 28, fixedly mounted on the mounting plate 27, is relatively deeply slotted or grooved at 32 to accommodate the upstanding walls 23 of the workpiece 24.

Arranged in side-by-side relationship to the die 28, the floating punch holder 29 is slidably mounted on a pair of up-right guide posts 33 on the mounting plate 27 for up-and-down motion relative to the die. Compression or lifting springs 34 are coiled around the respective lower end portions of the guide posts 33 for biasing the floating punch holder upwardly. The set of trimming punches 30 carried by this floating punch holder are stacked up vertically and cooperate to define cavities 35 for receiving with clearance the portions 23' of the upstanding walls 23 of the workpiece 24 to be cut off.

The work holder mechanism 31, arranged opposite to the floating punch holder 29, comprises a support block 36 fixedly mounted on the mounting plate 27, a presser 37 slidably supported by the support block for movement toward and away from the set of trimming punches 30, and a threaded rod 38 to be turned manually to cause the presser to move toward and away from the trimming punches for holding or releasing the workpiece.

Figure 5:
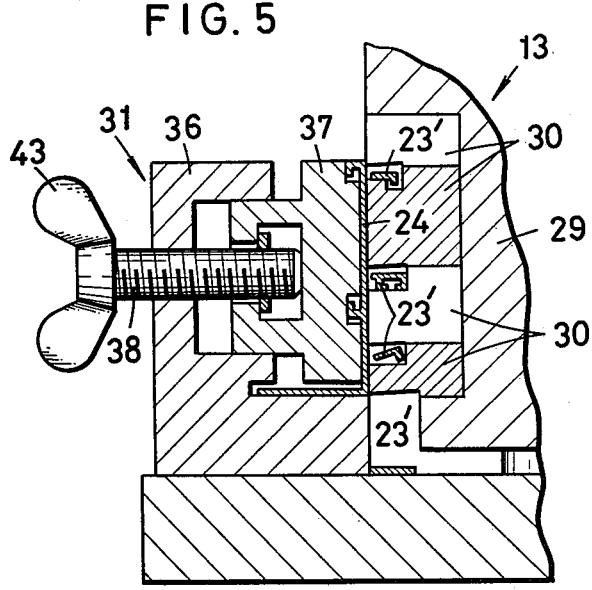
FIG. 5 is a view similar to FIG. 4 but showing the extruded window frame member after the trimming operation.

The threaded rod 38 extends horizontally through a tapped hole 39 in the support block 36 and has one of its ends inserted into a clearance hole 40 in the presser 37 for abutting contact with its closed end. The open end of the clearance hole 40 is lipped or flanged at 41 to engage a stop 42 on the threaded rod 38, so that the rod is restrained from withdrawal out of the clearance hole. Fixedly mounted on the other end of the threaded rod 38, projecting out of the tapped hole 39, is a knob 43 which may be shaped like a wing nut as shown in FIG. 5. Thus, by the manual turning of this knob 43 in either direction, the presser 37 can be moved back and forth with respect to the set of trimming punches 30 carried by the floating punch holder 29. The presser 37 is recessed at 44 to accommodate projections 45 formed on that side of the workpiece 24 opposite to its upstanding walls 23.

The punch-die assembly 14 shown in FIG. 1C is further illustrated in FIG. 2 as installed in its working position in the frame assembly 10. With reference therefore to both FIGS. 1C and 2, the punch-die assembly 14 has a die 46 fixedly mounted on a rectangular mounting plate 47, and a floating punch holder 48 carrying a perforating punch or punches 49 and arranged for up-and-down motion with respect to the die 46.

The die 46 is slotted or grooved at 50 to accommodate the end portions of the upstanding walls 23 of the workpiece 24 and has die apertures 51 with which the punches 49 cooperate as they pierce the workpiece.

Over the die 46 the floating punch holder 48 is slidably mounted on a pair of upright guide posts 52 erected on the mounting plate 47 and is thereby constrained to movement toward and away from the die 46. A pair of compression springs 53 are coiled around the respective guide posts 52 for biasing the floating punch holder 48 away from the die 46. Each of the mounting plates 27 and 47 of the punch-die assemblies 13 and 14 has a positioning recess, not shown, formed in its bottom face for receiving the positioning boss 18 on the bottom plate 16 of the frame assembly 10 when the press assembly is installed in position thereon.

In operation, for trimming the unnecessary portions 23' of the upstanding walls 23 of the workpiece 24, the punch-die assembly 13 is installed between the top and bottom plates 15 and 16 of the frame assembly 10, with the positioning boss 18 on the bottom plate fitted in the non-illustrated locating recess in the mounting plate 27 of the punch-die assembly. The punch-die assembly 13 is further engaged by all or some of the columns 17 of the frame assembly 10 so as to remain in position on the bottom plate 16.

The upstanding walls 23 of the workpiece 24 are then inserted into and through the slots 32 in the die 28 of the punch-die assembly 13 so that their unnecessary portions to be removed will be received in the cavities 35 in the trimming punch set 30 carried by the floating punch holder 29. The knob 43 on the threaded rod 38 is then turned manually in such a direction that the presser 37 is urged toward the trimming punch set 30. The workpiece can thus be caught tightly between the punches 30 and the presser 37 of the work holder mechanism 31.

The lever 22 on the pump 12 is now operated to supply pressurized fluid into the head end chamber of the hydraulic cylinder 11 via the delivery conduit 21, thereby causing descent of the ram 19 into the frame assembly 10. Since this ram overlies the floating punch holder 29 of the punch-die assembly 13 mounted in position on the bottom plate 16, as shown in FIG. 4, the punch holder with the trimming punch set 30 is simultaneously forced down relative to the work holder mechanism 31 and the die 28 against the bias of the compression or lifting springs 34.

FIG. 5 illustrates the unnecessary portions 23' of the upstanding walls 23 removed from the workpiece 24 by the trimming punches 30 which have been depressed as by the ram 19. The threaded rod 38 of the work holder mechanism 31 is then loosened by turning the knob 43 to cause retraction of the presser 37 away from the trimming punch set 30 and thus to permit the trimmed workpiece to be withdrawn from the punch-die assembly 13 in the frame assembly 10.

For punching the holes 26 in the plane portion of the workpiece 24 which has been formed by removal of the unnecessary upstanding wall portions 23' as described above, the other punch-die assembly 14 is installed in position in the frame assembly 10 in the above described manner. Then, as shown in FIG. 2, the plane portion of the workpiece 24 is placed over the die 46, with the adjacent end portions of its upstanding walls 23 accommodated in the die slots 50.

With the workpiece thus held in position over the die 46, the pump 12 is manually operated to actuate the hydraulic cylinder 11. By means of the ram 19 of the cylinder 11, the floating punch holder 48 is forced down against the bias of the compression springs 53 to thrust the punches 49 into the holes 51 in the die 46 through the workpiece. The desired holes 26 are thus formed in the plane portion of the extrusion 24. The perforated workpiece can be readily withdrawn from the punch-die assembly 14 as the ram 19 is subsequently retracted into the hydraulic cylinder 11.

Although particular adaptations of this invention have been described and illustrated herein, it is recognized that numerous modifications and variations may readily occur to those skilled in the art. For example, in the punch-die assembly 13, a pair of dies similar to the die 28 may be provided on opposite sides of the floating punch holder 29 so that the upstanding walls 23 of the workpiece may be trimmed anywhere between its ends. Furthermore, the dies 28 and 46, the punches 30 and 49 and the presser 37 of the punch-die assemblies 13 and 14 may be made readily replaceable to adapt the assemblies for use with various known types of extruded window frame members or the like. It is also understood that the particular punch-die assemblies shown are preferred examples of many such assemblies of essentially identical construction which can be used in the portable press apparatus according to the invention. The following claims, therefore, should be interpreted to cover all such modifications and equivalents.

What is claimed is:

1. Notching apparatus for use between the bed and ram of a press, comprising:
    (a) a base adapted to be supported on the press bed;
    (b) a plurality of dies on said base, disposed one above the other;
    (c) a punch holder supported on said base for sliding movement and adapted at one end to be driven by the ram;
    (d) a plurality of punches on said holder disposed one above the other and each having cutting edge means for cooperating with the die in response to driven movement by the ram, there being means defining a recess beneath each of said cutting edge means receptive of the portion of the workpiece which is to be removed; and
    (e) a workpiece presser adjustably carried on said base at one side of said punch holder, and adapted to engage the workpiece for biasing it in a direction transverse to that of said sliding punch holder movement for urging the workpiece to a fixed position of engagement against a lateral side of at least one of said punches.

2. Notching apparatus according to claim 1 in which at least one of said recess means is in the upper side of the punch directly below the punch having one of said cutting edge means.

3. Notching apparatus according to claim 1 in which said punches are directly superimposed against each other, said cutting edge means extending substantially horizontally.

4. Notching apparatus according to claim 1 in which said presser is engageable with the workpiece at the side thereof which is opposite to but registers with the part of the workpiece to be engaged by said punches.

5. Notching apparatus for use between the bed and ram of a press, comprising:
    (a) a base adapted to be supported on the press bed and adapted to support at least one die thereon;
    (b) a punch holder supported on said base for sliding movement and adapted at one end to be driven by the ram, said punch holder being adapted to support at least one punch for cooperating with the die in response to driven movement by the ram; and
    (c) a workpiece presser adjustably carried on said base and disposed at all times in confronting relation to one lateral side of said punch holder, and adapted to engage the workpiece for biasing it in a direction transverse to that of said sliding punch holder movement for urging the workpiece to a fixed position of slidable engagement with a lateral side of the punch so that the workpiece can be clamped between the punch and said presser.

6. Notching apparatus according to claim 5 including:
    (a) C-shaped bracket on said base slidably receiving a portion of said presser within its C-shape; and
    (b) clamping means acting between said bracket and said presser for moving it toward and away from the workpiece.

7. A notching apparatus according to claim 5 in which the surface of said presser which is engageable with the workpiece has horizontally elongated recess means receptive of at least one projecting portion of the workpiece directed away from the punch holder.

8. Notching apparatus according to claim 5 including:
    (a) a die supported on said base; and
    (b) a punch on said holder having cutting edge means, there being means defining a recess beneath said cutting edge means receptive of the portion of the workpiece which is to be removed.

* * * * *